Nov. 15, 1960
L. BERL
2,960,386
PROCESS FOR THE RECOVERY OF NITRIC OXIDE
Filed Oct. 24, 1956
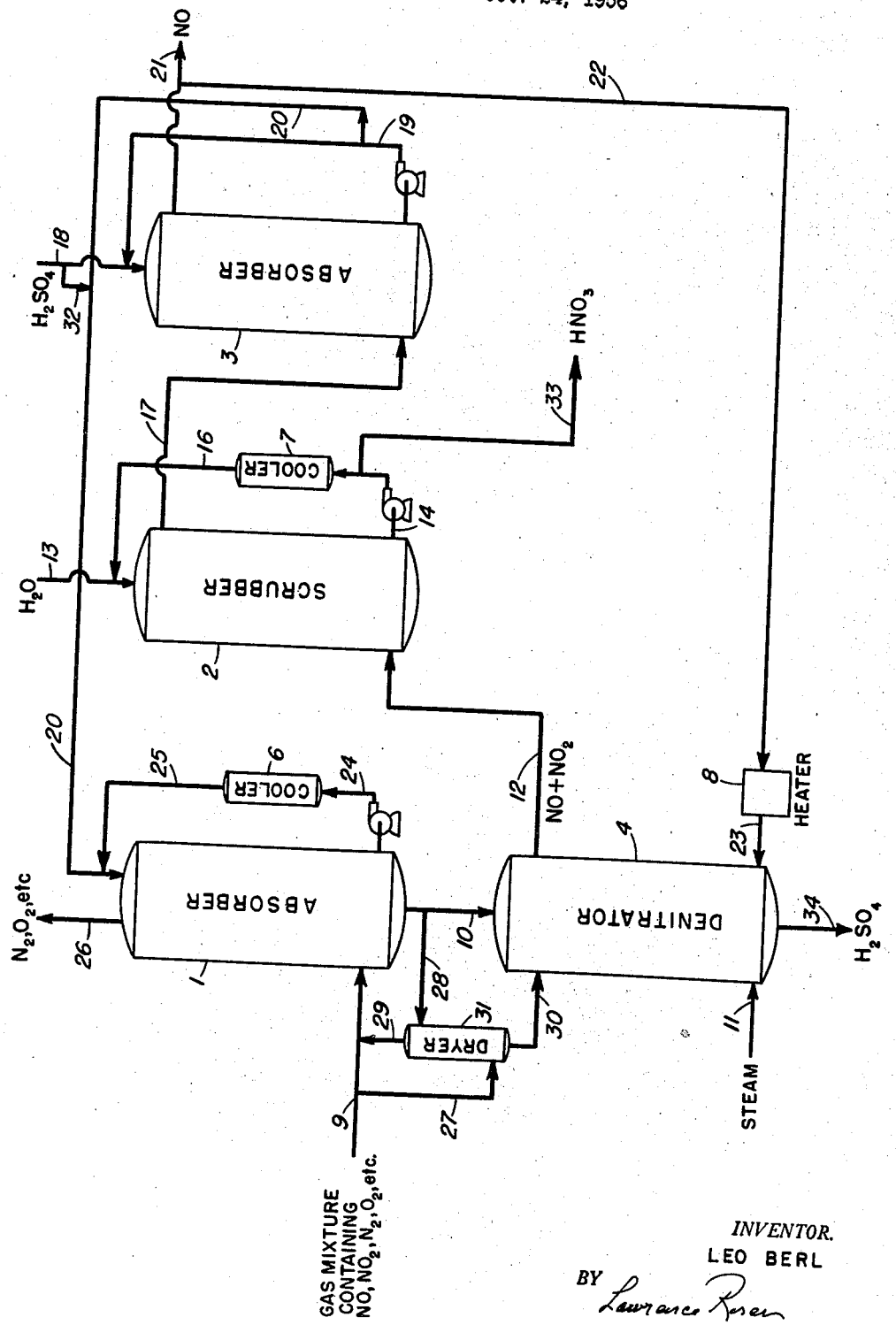
INVENTOR.
LEO BERL
BY Lawrence Rosen
ATTORNEY United States Patent Office 2,960,386
Patented Nov. 15, 1960

2,960,386
PROCESS FOR THE RECOVERY OF NITRIC OXIDE

Leo Berl, Cincinnati, Ohio, assignor to National Distillers and Chemical Corporation, New York, N.Y., a corporation of Virginia Filed Oct. 24, 1956, Ser. No. 618,080

10 Claims. (Cl. 23—161)

This invention relates to a new and improved method for the recovery of nitric oxide. More particularly, the invention pertains to the separation and purification of nitric oxide from gases containing other nitrogen oxides and inert gases.

Though many nitric oxide-containing gases are available as a potential source of nitric oxide, the separation of pure nitric oxide from the other gaseous constituents has not been commercially feasible. An excellent source of nitric oxide, for example, can be obtained in the production of nitric acid by the catalytic oxidation of ammonia. The oxidation results in a gas mixture containing nitric oxide, nitrogen dioxide, nitrogen and excess oxygen. One object of this invention is the recovery of substantially pure nitric oxide from the above gas mixture. Another object of this invention is the recovery of substantially pure nitric oxide from gaseous mixtures containing nitric oxide and other nitrogen compounds such as nitrogen dioxide. Additional objects of this invention will appear from the following description and the accompanying drawing.

In accordance with one embodiment of this invention, nitric oxide and nitrogen dioxide are absorbed from a gas containing the same by contacting the gas with concentrated sulfuric acid. The oxides of nitrogen are subsequently liberated from the absorption solution by contacting it with live steam and/or heated nitric oxide, recovered as hereinafter described. Nitrogen dioxide is then separated from nitric oxide by scrubbing the nitrogen oxides with water. The scrubbed gas is then again contacted with concentrated sulfuric acid to remove the final portion of nitrogen dioxide and to recover substantially pure nitric oxide.

The process of the present invention may be advantageously carried out in the apparatus diagrammatically illustrated in the accompanying drawing. With reference to the drawing, there is provided absorbers 1 and 3, water scrubber 2, denitrator 4, drier 31, coolers 6 and 7, and heater 8. Any equipment well known in the art of absorption or acid treatment may be employed. Absorption towers 1 and 3 may, for example, be either packed columns or bubble towers.

In operation, a gas mixture obtained by the catalytic oxidation of ammonia and comprising nitric oxide, nitrogen dioxide, nitrogen, oxygen, etc. is passed via line 9 to the bottom of absorber 1. If water vapor is present in the gas mixture, it is removed by any conventional cooling or drying technique. In accordance with one aspect of the invention, the feed gas mixture may be dried by passing it via line 27 to the bottom of drier 31, countercurrently treating the gas mixture with sulfuric acid containing absorbed nitrogen oxides introduced into the top of drier 31 via line 28, and then passing the dried gas mixture to absorber 1 via lines 29 and 9. As the gas mixture passes upward in absorber 1, it contacts a sulfuric acid solution containing at least 78% of $H_2SO_4$. The nitrogen oxides are absorbed by the sulfuric acid which is then passed via line 10 to denitrator 4. As previously noted, a portion of the sulfuric acid containing absorbed nitrogen oxides may be directed to drier 31 via lines 10 and 28 to dry the feed gas mixture. It is possible, of course, to use as a source for nitric oxide a gas stream which is substantially free from water. Thus, for example a nitric oxide-containing gas stream obtained by air oxidation or a gas stream obtained from an ammonia oxidation system at a stage where it is essentially free of water may be utilized. In such cases the initial drying step can be omitted. The sulfuric acid containing the nitrogen oxides leaving drying tower 31 is passed via line 30 to the top of denitrator 4. Gases such as nitrogen, oxygen, etc. unabsorbed in absorber 1 are vented to the atmosphere via line 26 or recovered, if desired. To ensure a high absorption efficiency in absorber 1, the sulfuric acid absorbant may circulate via line 24, line 25 and line 20 to the top of the absorber. The circulating sulfuric acid is preferably cooled in cooler 6 to maintain an effective absorption temperature.

In denitrator tower 4 superheated steam and/or heated nitric oxide, recovered as hereinafter described, passed via lines 11 and 23, respectively, to the bottom of the tower, countercurrently desorb the downwardly flowing sulfuric acid absorbate of the nitrogen dioxide and nitric oxide. Diluted sulfuric acid is withdrawn from denitrator 4 via 34. If desired, the recovered acid may be concentrated in any manner well known to the art and utilized in absorber 3. In order to avoid oxidation and contamination of the nitric oxide, air or other oxygen-containing gases are not employed in the desorption step. Therefore, in place of air or other inert stripping gases which would contaminate the nitric oxide, a portion of the pure nitric oxide, recovered as described below, is heated up and introduced to the lower portion of denitrator 4 as a stripping gas.

A gas stream comprising essentially nitric oxide and nitrogen dioxide is passed via line 12 from the top of denitrator 4 to the bottom of water scrubber 2. Water is introduced via line 13 to the top of scrubber 2, and countercurrently contacts the upward flowing nitric oxide and nitrogen dioxide gases. The scrubbing operation is conducted so as to remove about 90 to 98%, preferably, about 94 to 96%, of the nitrogen dioxide through reaction with the water to produce nitric acid. The aqueous nitric acid solution may advantageously be recirculated via lines 14, 16 and 13. The nitric acid solution is preferably cooled in cooler 7 prior to being reintroduced into the scrubber. Removal of the nitric acid solution from the system is accomplished by withdrawing it via lines 14 and 33 from the bottom of scrubber 2.

Nitric oxide containing residual nitrogen dioxide is passed via line 17 from the top of scrubber 2 to the bottom of absorber 3. Concentrated sulfuric acid, about 66° Bé., is introduced to the top of absorber 3 via line 18 and flows countercurrently to the nitric oxide. The final portion of nitrogen dioxide is absorbed by the concentrated sulfuric acid and the absorbant solution, recovered from absorber 3 via line 19, may be recirculated to the top of the tower via line 18 or passed via line 20 to the top of absorber 1. Substantially pure nitric oxide leaves absorber 3 via line 21 and is recovered. A portion of the nitric oxide gas may be passed via line 22, heater 8 and line 23 to the bottom of denitrator 4 for desorption of the nitrogen oxides.

It will be understood that a continuous or semi-continuous process for the recovery of nitric oxide from nitrogen oxide-containing gases is within the scope of this invention. Additional absorption, water scrubbing and denitration towers either in series or in parallel may readily be provided. It is further understood that any nitric oxide-containing gas may be employed as the feed gas mixture provided it contains $NO_2$ or that oxygen is added to form $NO_2$. The process of this invention is particularly applicable to gas mixture containing nitrogen oxides such as nitrogen dioxide in addition to the nitric oxide. When nitrogen dioxide is present, it is important that the mol ratio of nitrogen dioxide to nitric oxide does not exceed 1:1 at the time the gas mixture contacts the sulfuric acid solution. A mol ratio of nitrogen dioxide to nitric oxide within the range of about 1:3 to 1:1 is preferred and an equal mol proportion of the two gases is especially preferred.

In general, the mol ratio of the nitrogen dioxide and nitric oxide can be controlled by varying the temperature, residence time and pressure of the gas mixture. The relative proportions of the nitrogen oxides in the feed gas may also be conveniently controlled by the degree of cooling applied on a cooler-condenser, if this method is used in freeing the gas mixture from water vapor, and the degree of cooling in absorber 1. Should the mol ratio of nitrogen dioxide to nitric oxide exceed 1:1, it is possible to adjust the mol ratio within the desired range by heating the gas to a temperature within the range of about 50° to 600° C.

Since water tends to weaken the ability of the sulfuric acid to absorb nitrogen oxides, it is important to remove water from the feed gas prior to its introduction into absorber 1. As discussed above, the gas mixture may readily be dehydrated by countercurrently contacting it in drier 31 with the absorbent solution withdrawn from the bottom of absorber 1. Alternatively, the feed gas mixture may be cooled to a temperature sufficiently low to condense the water vapor. A temperature within the range of about 0° to 60° C. could be effectively employed for such purposes. The use of both cooling and drying techniques to obtain a substantially anhydrous gas feed mixture is also contemplated.

The concentration of the sulfuric acid employed in absorber 1 is preferably about 78 to 97%. The sulfuric acid supplied to absorber 1 may be the sulfuric acid solution recovered from absorber 3 during the removal of the final traces of nitrogen dioxide from the nitric oxide. Fresh sulfuric acid may, of course, be employed, particularly during the starting up operation. This acid may be supplied to absorber 1 via lines 18, 32 and 20. Since nitric oxide is practically insoluble and nitrogen dioxide only slightly soluble in the sulfuric acid, it is desirable that the mol ratio of nitrogen dioxide to nitric oxide does not exceed 1:1, as described above. In general, a temperature of about 0° to 100° C. and a pressure of about 1 to 150 p.s.i.g. are maintained in absorber 1 to obtain a high absorption efficiency. The nitrogen oxide content of the circulating sulfuric acid in absorber 1 is not allowed to rise above about 8 to 15% before being sent to denitrator 4.

In denitrator 4 a temperature within the range of about 100° to 300° C. and a pressure of about 0 to 20 p.s.i.g. are usually employed. Desorption of the nitrogen oxides from the sulfuric acid may be accomplished either by contacting the absorbant solution withdrawn from absorber 1 with superheated steam or nitric oxide, heated to a temperature of about 100° to 600° C. The use of both superheated steam and heated nitric oxide is also within the scope of this invention. The sulfuric acid withdrawn from the denitrator usually has a concentration of about 65 to 80% and may be utilized as such or concentrated and reused in the present process.

It is also an important feature of this invention that air or oxygen be positively excluded from water scrubber 2 during the removal of nitrogen dioxide from the nitrogen oxide-containing gas recovered from denitrator 4. The removal of nitrogen dioxide is believed to occur in accordance with the following reaction:

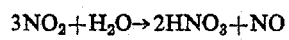

If air or oxygen were present, the nitric oxide would be oxidized to nitrogen dioxide and additional nitric acid produced. Since the object of this invention is to recover nitric oxide rather than nitric acid, the water scrubbing step must be carried out in the absence of oxygen and with at least a sufficient amount of water to convert the desired percentage of nitrogen dioxide to nitric acid. The high concentration of nitrogen dioxide and nitric oxide in the feed gas to scrubber 2 would permit complete removal of the nitrogen dioxide at this stage even under atmospheric pressure. However, very large absorption towers would be necessary. In accordance with the preferred embodiment of this invention, only about 94 to 96% of the nitrogen dioxide is removed in scrubber 2. The residual amount of nitrogen dioxide is then removed from the nitric oxide in absorber 3. In general, a temperature of about 0° to 50° C. and the pressure of about 1 to 150 p.s.i.g. will be employed in scrubber 2.

Concentrated sulfuric acid of about 66 Bé. is employed in absorber 3 to remove the residual nitrogen dioxide. In order to ensure a high order of absorption of the nitrogen dioxide, a temperature of about 0° to 50° C. and a pressure of about 1 to 150 p.s.i.g. will be utilized. An equivalent amount of nitric oxide will also be removed with the nitrogen dioxide in accordance with the following reaction:

The sulfuric acid solution is continuously recirculated until the nitrogen oxide content rises to above about 1%. At this point, the sulfuric acid solution is bled off and fed to the top of absorber 1.

In order that the invention may be more fully understood, reference is made to the following specific example illustrating one embodiment of the invention.

*Example*

A mixture of ammonia and air containing about 10% ammonia is oxidized in the presence of a platinum-rhodium catalyst. The resulting gas mixture containing nitric oxide, nitrogen dioxide, water vapor, nitrogen, oxygen, etc. is cooled to a temperature of about 35° C. Water of reaction is condensed in the form of weak nitric acid and collected. To ensure removal of all the water vapor, the cooled gas mixture is countercurrently contacted with sulfuric acid containing absorbed nitrogen oxides at a temperature of about 50° C. The anhydrous gas mixture is then countercurrently contacted with concentrated sulfuric acid at a temperature of about 40° C. and a pressure of about 2 p.s.i.g. The sulfuric acid containing absorbed nitrogen oxides is then passed to a denitrator. Nitric oxide and nitrogen dioxide are next desorbed from the sulfuric acid by the use of superheated steam and nitric oxide heated to a temperature of about 300° C. The recovered nitric oxide and nitrogen dioxide are then scrubbed with water at a temperature of 35° C. and a pressure of about 2 p.s.i.g. in the absence of oxygen. About 95% of the nitrogen dioxide is removed from the nitric oxide by reaction with the water. The final portion of nitrogen dioxide is then removed from the nitric oxide by absorption with sulfuric acid, 66° Bé. Substantially pure nitric oxide is recovered.

It should be understood that the invention is not limited to the raw materials and conditions set forth above. These materials and conditions may be varied within the broad limits set forth in the general description of the invention.

What is claimed is:

1. A process for the recovery of purified nitric oxide from a gas mixture obtained by the oxidation of ammonia, which comprises removing water vapor from said gas mixture, contacting in a first absorption zone the resulting substantially anhydrous gas mixture wherein the mol ratio of nitrogen dioxide to nitric oxide is less than about 1:1 with a concentrated sulfuric acid solution whereby nitric oxide and nitrogen dioxide are absorbed from said gas mixture, withdrawing unabsorbed gases from said first absorption zone, passing the nitric oxide and nitrogen dioxide enriched sulfuric acid from said first absorption zone to a denitration zone, desorbing said nitric oxide and nitrogen dioxide from said sulfuric acid solution, contacting said desorbed nitric oxide and nitrogen dioxide with water in the absence of an oxygen-containing gas whereby a substantial proportion of the nitrogen dioxide is converted to nitric acid, recovering nitric oxide, contacting said recovered nitric oxide with concentrated sulfuric acid in a second absorption zone to remove residual nitrogen dioxide, and then recovering substantially pure nitric oxide.

2. The process of claim 1 wherein said mol ratio is within the range of about 1:3 to 1:1.

3. The process of claim 1 wherein the nitric oxide and nitrogen dioxide are desorbed from the sulfuric acid solution with superheated steam.

4. The process of claim 1 wherein the nitric oxide and nitrogen dioxide are desorbed from the sulfuric acid solution with superheated steam and heated nitric oxide.

5. The process of claim 1 wherein the nitric oxide and nitrogen dioxide are desorbed from the sulfuric acid solution with heated nitric oxide.

6. The process of claim 1 wherein the sulfuric acid solution contains about 78 to 97% sulfuric acid.

7. The process of claim 1 wherein said concentrated sulfuric acid used in said second absorption zone is about 66° Bé.

8. The process of claim 1 wherein about 90 to 98% of the nitrogen dioxide is converted to nitric acid by contacting it with water.

9. A process for the recovery of purified nitric oxide from a substantially anhydrous gas mixture containing nitric oxide and nitrogen dioxide which comprises contacting in a first absorption zone the substantially anhydrous gas mixture with a concentrated sulfuric acid solution, the mol ratio of nitrogen dioxide to nitric oxide in said anhydrous gas mixture being less than about 1:1, whereby nitric oxide and nitrogen dioxide are absorbed from said gas mixture, withdrawing unabsorbed gases from said first absorption zone, passing sulfuric acid enriched with nitric oxide and nitrogen dioxide from said first absorption zone to a denitration zone, desorbing said nitric oxide and nitrogen dioxide from said sulfuric acid solution, contacting said desorbed nitric oxide and nitrogen dioxide with water in the absence of an oxygen-containing gas whereby a substantial proportion of the nitrogen dioxide is converted to nitric acid, recovering nitric oxide, contacting said recovered nitric oxide with concentrated sulfuric acid in a second absorption zone to remove residual nitrogen dioxide, and then recovering substantially pure nitric oxide.

10. The process of claim 9 wherein said sulfuric acid solution contains at least 78% sulfuric acid.

References Cited in the file of this patent

UNITED STATES PATENTS

| | | |
|---|---|---|
| 910,530 | Halvorsen | Jan. 26, 1909 |
| 1,631,139 | Larison | July 7, 1927 |
| 1,912,833 | Fairlie | June 6, 1933 |
| 2,325,066 | Marcotte | July 27, 1943 |
| 2,543,446 | Egly | Feb. 27, 1951 |

FOREIGN PATENTS

| | | |
|---|---|---|
| 18,280 | Great Britain | 1909 |
| 365,949 | Great Britain | Jan. 28, 1932 |
| 413,838 | Great Britain | July 26, 1934 |